US005483302A

United States Patent [19]

Jaffelin

[11] Patent Number: 5,483,302
[45] Date of Patent: Jan. 9, 1996

[54] ELASTIC SPECTACLE HINGE

[75] Inventor: Etienne Jaffelin, Les Rousses, France

[73] Assignee: Chevassus S.A., Morez, France

[21] Appl. No.: 230,925

[22] Filed: Apr. 21, 1994

[30] Foreign Application Priority Data

May 4, 1993 [FR] France ................... 93 05543

[51] Int. Cl.⁶ .................. G02C 5/16; G02C 5/22
[52] U.S. Cl. .................. 351/113; 351/121; 351/153; 16/228
[58] Field of Search ............... 16/228; 351/111, 351/113, 114, 119, 121, 153

[56] References Cited

U.S. PATENT DOCUMENTS

| | | | |
|---|---|---|---|
| 3,166,754 | 1/1965 | Stegeman | 351/121 X |
| 4,534,628 | 8/1985 | Morel | 351/121 X |
| 4,617,698 | 10/1986 | Drlik | 351/153 X |
| 4,832,479 | 5/1989 | Beyer et al. | 16/228 |
| 4,991,258 | 2/1991 | Drlik | 16/228 |
| 5,018,242 | 5/1991 | Guy et al. | 16/228 |

FOREIGN PATENT DOCUMENTS

| | | |
|---|---|---|
| 0149230 | 5/1986 | European Pat. Off. . |
| 0191944 | 8/1986 | European Pat. Off. . |
| 0262099 | 3/1988 | European Pat. Off. . |
| 0308533 | 3/1989 | European Pat. Off. . |
| 340161 | 11/1989 | European Pat. Off. . |
| 0378969 | 7/1990 | European Pat. Off. . |
| 0426947 | 5/1991 | European Pat. Off. . |
| 1511263 | 1/1968 | France . |
| 2466788 | 4/1981 | France . |
| 2519434 | 7/1983 | France . |
| 2609816 | 7/1988 | France . |
| 9012710 | 2/1992 | Germany . |
| 859931 | 1/1961 | United Kingdom . |

*Primary Examiner*—William L. Sikes
*Assistant Examiner*—David R. Parsons
*Attorney, Agent, or Firm*—Henderson & Sturm

[57] ABSTRACT

An elastic hinge for a pair of spectacles is made, on the one hand, of a front-hinge element (10) securely fixed to a side lug (6) of the front part; and, on the other hand, of a side-hinge element (20) connected by elastic biasing means (12, 30, 40, 44) at the end of the side arm (8). The outer edge of the end (9) of the side arm (8) bears against a fixed heel (7) extending from the lug (6) or integral with the front-hinge element. This heel (7) extends beyond the axis (15) of the hinge by a distance (d) greater than 0.3 millimeters. Moreover, the side-hinge element (20) has, in its face directed towards the side arm, a recessed edge (32) which after rotation through a desired maximum angle (θ), comes to bear against the abutment-forming inside angled edge (5) of the heel (7).

19 Claims, 1 Drawing Sheet

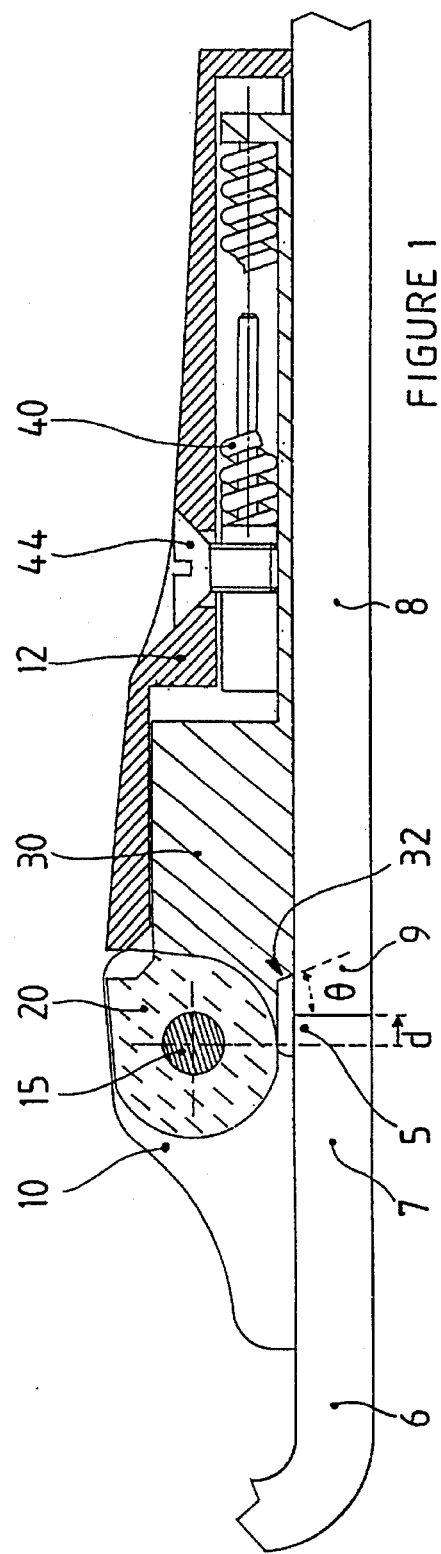
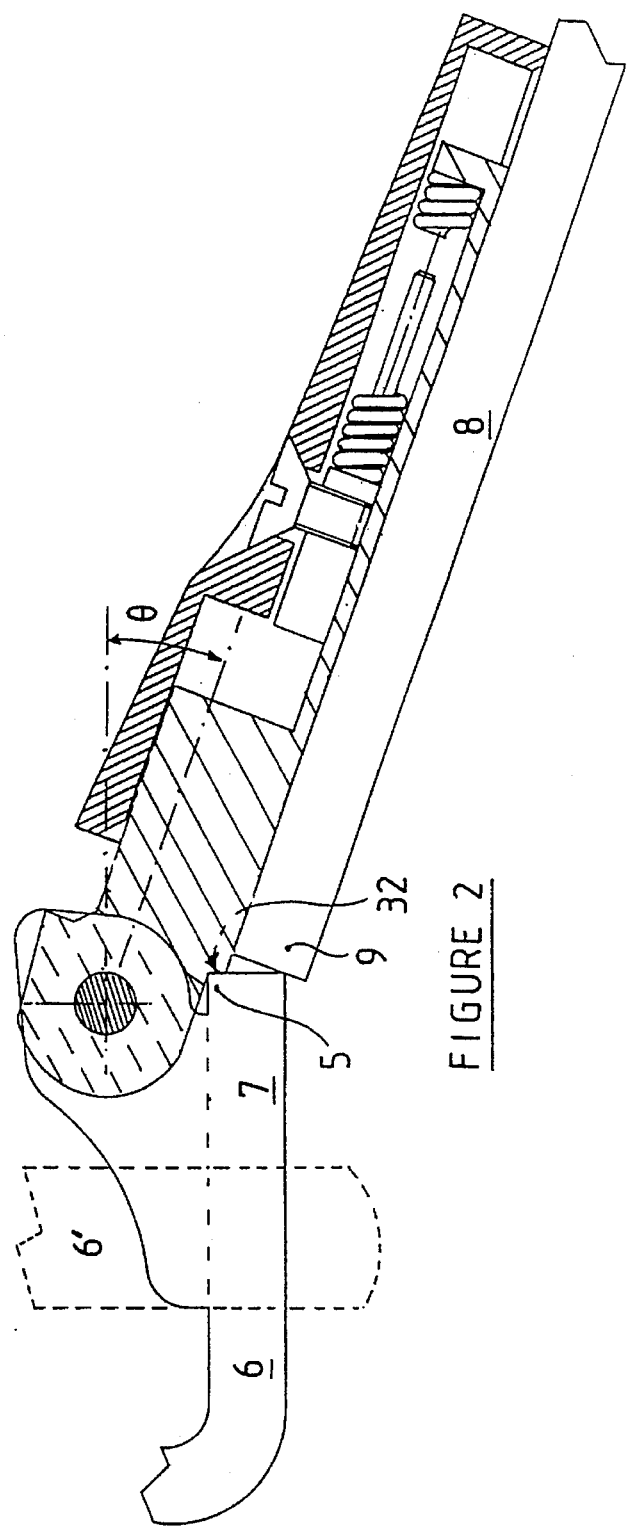

ELASTIC SPECTACLE HINGE

BACKGROUND OF THE INVENTION

FIELD OF THE INVENTION

The present invention relates to an elastic hinge for connecting a side arm to a front part of a pair of spectacles. The hinge of the present invention allows an additional outward elastic displacement of the side arm beyond its open position. Such hinges provide additional comfort in the wearing of spectacles which is greatly appreciated by the public, particularly due to the fact that the side arms bear against the temples with a reasonable pressure.

DISCUSSION OF MATERIAL AND/OR BACKGROUND INFORMATION

Generally speaking, an elastic hinge is made up, on the one hand, of a front hinge element, or charnier, solidly secured in the side lug of the front part, which lug may be straight, protruding, rounded or elbow-shaped; and, on the other hand, a side hinge element connected by an elastic biasing mechanism to the end of the side arm, with a pin connecting the hinge element.

In a first known type of biasing mechanism, a male side charnier is provided at the protruding end of a sliding part which is slidably mounted inside a casing welded onto the inner face of the end of the side arm. In the sliding part a longitudinal slot is provided for housing a spring whose front end comes to abut against a pin or a screw passing through the casing and the slot. This type of elastic hinge is described, for example in EP 0 426 947, FR 2 466 788, FR 1 511 263 and EP 0 262 099.

In a second known type of biasing mechanism, the side charnier is also a male part provided at the protruding end of a pin which is slidably mounted inside a casing which is also fixed to the inner face of the end of the side arm. A spring located around this pin bears at one end against a thickened part provided at the end of the pin and, at the other end, against an internal restriction of the casing. This type of elastic hinge is described, for example in EP 0 340 161 or FR 2 609 816.

In a third type of known biasing mechanism, a female side charnier is provided at the end of the casing which is slidably mounted along a fixed rail against the inside face of the end of the side arm. An internal spring bearing against an abutment adjacent the hinge element urges the bottom of the casing rearwardly. This type of elastic hinge element is described, for example in EP 0 191 944 or EP 0 308 533.

Furthermore, the outer edge of the end of the side arm bears against a fixed heel of mitre which may be the inner face of a straight lug, but which is generally the outer edge of the end of an elbow-shaped lug in alignment with the side arm. Hence, upon movement of the side arm beyond its open position, the inside edge of the end of the side arm moves away from the fixed hinge with a kind of rotation about the bearing point, which movement compresses the spring of the previously-described biasing mechanism.

If the outward movement of the side arms exceeds the norm, an excessive traction is induced through the biasing mechanism which in the long term results notably in squashing the spring in a way liable to modify its initial stiffness. Furthermore, nowadays when designing such elastic hinges, it is necessary to provide sliding parts which are sufficiently strong to resist accidental forces up to 40 Kg. However, the drawback is that these sliding parts and springs are necessarily large, which leads to corresponding large dimensions for these hinges which are then not considered to be aesthetic or attractive.

A goal of the present invention is to provide an elastic hinge that can withstand very large instantaneous forces without necessarily requiring over-dimensioning of the biasing mechanism. The design of the constituent parts must, however, remain simple to keep production costs low.

SUMMARY OF THE INVENTION

These aims and goals are achieved in an elastic hinge made, on the one hand, of a front-hinge element securely fixed to the side lug of the front part; and, on the other hand, a side-hinge element connected by elastic biasing means at the end of the side arm wherein the outer edge of the end of the side arm bears against a fixed heel of mitre which either extends from the lug, or is integral with the front-hinge element, due to the fact that the heel extends beyond the axis of the hinge by a distance greater than 0.3 millimeters, and due to the fact that the side-hinge element has, in its face directed towards a side arm, a recessed edge which, after rotation through a desired maximum angle, comes to bear against the abutment-forming inside angle of the heel.

Accordingly, once the maximum allowable movement has been reached the side hinge element comes to hook into the heel, which protects the biasing mechanism from any further opening force. It is thus possible, without risk, to produce much more slender and aesthetic or attractive mechanisms, which can support a maximum traction, without deformation of the slide, which, however, is much less, for example of the order of 10 kilograms.

Advantageously, the recessed edge is planar and forms, with the joining plane of the heel and the end of the side arm when the latter is in the open position, an angle equal to the desired maximum angle of rotation. The side hinge element thus engages plane-by-plane against the heel, providing a firm support.

BRIEF DESCRIPTION OF DRAWING

The present invention will be well understood from the description of an embodiment by way of non-limiting example, with reference to the following figures, in which:

FIG. 1 is a cross-sectional view of an elastic hinge with the side arm of the spectacle in the open position.

FIG. 2 is a cross-sectional view of the elastic hinge of FIG. 1, with the side arm in the position of maximum outward opening.

DETAILED DESCRIPTION

As illustrated in the figures, the spectacle hinge comprises on the left-hand side a front hinge element or charnier 10 fixed to the inner face of an elbow-shaped lug 6 whose other end is connected to the rim for the front lens. This front hinge element may be welded or made in one part, i.e. integral, with the lug. On the right-hand side of the figures, a side hinge element 20 is connected to the end of a side arm 8 by a biasing mechanism permitting an elastic movement of the side arm towards the right.

As shown, the biasing mechanism comprises a slide 30 which is slidable mounted inside a casing 12 against the force of a spring 40 housed in a slot of this slide. This spring bears, at the left-hand end, against an abutment 44 fixed to the casing, which abutment is formed in this example by a screw; and, on the right-hand side, against an internal end wall of this slide. The side hinge element or charnier 20 forming the protruding end of the slide is connected to the front hinge element 10 by a pin 15.

When the side arm is in the open position, as illustrated in FIG. 1, release of the pressure of spring 40 pushes the abutment 44, hence the casing 12, towards the left, which pushes the side arm 8 against the end of lug 6 with an orthogonal plane-by-plane contact, this end forming a bearing heel 7. Usually, this heel-arm contact surface is retracted relative to the pin 15, i.e. to the left, as illustrated in FIG. 1. To the contrary, in the hinge according to the invention, this contact surface is positively shifted to the right by a distance "d" of a least 0.3 millimeters and preferably 0.5 to 0.9 millimeters, depending on the overall height of the hinge, and in such a manner that the end of this heel 7 is much closer to the slide 30.

Moreover, according to the present invention, there is provided in the face of the side hinge element 20 and facing the side arm 8, a recessed edge 32 in the form of a plane making an angle "θ" with the plane of the heel/arm junction, and withdrawn relative to the level of pin 15 by a distance which is a function of the desired height of the pin and the desired angle "θ", and which in general is substantially equal to twice the distance "d", namely on the order of 1 to 2 millimeters.

Hence, when the side arm 8 is pivoted beyond its so called open position, as shown in FIG. 2, the hinge 20 and slide 30 rotate about pin 15. The heel 7 thus imparts a retracting movement to the side arm 8, whose end 9 scrapes against the outer edge of this heel 7. This withdrawing movement of the side arm 8 induces a compression in spring 40. However, according to the invention, as soon as this pivoting has reached a maximum desired angle "θ", usually comprised between 15° and 25°, the recessed edge 32 comes to bear against the inside edge 5 of the heel, which engages the slide 30.

In other words, the prominence of the heel 7 relative to pin 15 ensures that the inner edge 5 can act as an abutment for the recessed edge 32 whose shape and position have been chosen in every precise manner to come to bear plane-against-plane as soon as the desired maximum pivoting angle "θ" has been reached. Any additional pivoting is thus rendered impossible even though the windings or spirals of spring 40 are not yet Joined together, and even though the slide has not reached its limiting traction that would produce an irreversible plastic deformation.

Moreover, all of the additional forces are taken up between the heel 7 and slide 30 which are relatively massive parts of this hinge, whereby the other constituent parts of the biasing mechanism are isolated. These pieces of the mechanism can thus be designed solely as a function of a maximum traction and of the required stiffness sufficient for limited movements up to the angel "θ", namely at lower values than before. This biasing mechanism can thus be miniaturized or reduced in size without risk.

As has been shown, the abutment device according to the invention concerns essentially the side hinge element and the heel of the lug, and may thus be applied to any type of biasing mechanism.

The present invention is also not limited to the elbow-shaped lug 6 as illustrated in FIG. 1, but it may also be applied to a straight lug 6' as shown in dashed lines in FIG. 2, of the type frequently used for plastic spectacle frames, however, as long as the front hinge element 10 is fitted with a heel. Many improvements may be made to this abutment device of an elastic hinge within the scope of this invention.

I claim:
1. A spectacle frame comprising: a front part having side lugs; side arms pivotally connected to said side lugs: an elastic hinge comprising a front-hinge element fixed to one of said side lugs; a side-hinge element connected by elastic biasing means to one of said side arms, said one of side arms having an end with an outer edge bearing against a fixed heel extending from a member selected from a group consisting of said one of said side lugs and a said front-hinge element, wherein said side-hinge element comprises, in a face directed towards said side arm, a planar recessed edge forming with a joining plane of said fixed heel and said bearing end of said one end of said side arms, when the latter is in the open position, an angle equal to a desired maximum angle of rotation (θ), after which said planar recessed edge comes to bear against an abutment-forming inside angled edge of said heel, wherein said heel and said planar recessed edge of said side-hinge element extends beyond an axis of said hinge by a distanced greater than about 3 millimeters.

2. The spectacle frame of claim 1, wherein said member comprises said one of said side lugs.

3. The spectacle frame of claim 1, wherein said member comprises said front-hinge element.

4. The spectacle frame of claim 3, wherein said front-hinge element is integral with said fixed heel.

5. The spectacle frame of claim 1, wherein said distance of said planar recessed edge beyond said axis of said hinge is about twice the distance (d) of said heel beyond said axis of said hinge.

6. The spectacle frame of claim 1, wherein said distance (d) of said heel beyond said axis of said hinge is within the range of about 0.5 to about 0.9 millimeters.

7. The spectacle frame of claim 6, wherein said distance of said planar recessed edge beyond said axis of said hinge is within the range of about 1 to about 2 millimeters.

8. The spectacle frame of claim 1, wherein said maximum angle (θ) is within the range of about 15° and about 25°.

9. The spectacle frame of claim 1, wherein said elastic biasing means comprises a spring.

10. The spectacle frame of claim 9, wherein said elastic biasing means comprises a slide comprising a slot slidably mounted in a casing against a force of said spring housed in said slot.

11. The spectacle frame of claim 10, wherein said elastic biasing means comprises an abutment in contact with an end of said spring.

12. The spectacle frame of claim 11, wherein said abutment comprises at least one member selected from a group consisting of an internal end wall of said slide, and a removable means for connecting said slide to said casing.

13. The spectacle frame of claim 11, wherein said abutment comprises a removable means for connecting said slide to said casings.

14. The spectacle frame of claim 13, wherein said removable means for connecting comprises a screw.

15. A spectacle frame comprising: a front part having side lugs; side arms pivotally connected to said side lugs; an elastic hinge comprising a front-hinge element fixed to one of said side lugs; a side-hinge element connected by elastic biasing means to one of said side arms, said one of said side arms having an end with an outer edge bearing against a fixed heel extending from a member selected from a group consisting of said one of said side lugs and a said front-hinge element, wherein said side-hinge element comprises, in a face directed towards said side arm, a planar recessed edge forming with a joining plane of said fixed heel and said bearing end of said one end of said side arms, when the latter is in the open position, an angle equal to a desired maximum angle of rotation (θ), after which said planar recessed edge comes to bear against an abutment-forming inside angled edge of said heel, wherein said heel and said planar recessed edge of said side-hinge element extends beyond an axis of said hinge by a predetermined distance (d) wherein said distance of said planar recessed edge beyond said hinge is about twice the distance (d) of said heel beyond said axis of said hinge.

16. The spectacle frame of claim 16, wherein said maximum angle (θ) is within the range of about 15° and about 25°.

17. The spectacle frame of claim 15, wherein said distance (d) of said heel beyond said axis of said hinge is within the range of about 0.5 to about 0.9 millimeters.

18. The spectacle frame of claim 17, wherein said distance of said planar recessed edge beyond said axis of said hinge is within the range of about 1 to about 2 millimeters.

19. A spectacle frame comprising: a front part having side lugs; side arms pivotally connected to said side lugs; an elastic hinge comprising a front-hinge element fixed to one of said side lugs; a side-hinge element connected by elastic biasing means to one of said side arms, said one of said side arms having an end with an outer edge bearing against a fixed heel extending from a member selected from a group consisting of said one of said side lugs and a said front-hinge element, wherein said side-hinge element comprises, in a face directed towards said side arm, a planar recessed edge forming with a joining plane of said fixed heel and said bearing end of said one end of said side arms, when the latter is in the open position, an angle equal to a desired maximum angle of rotation (e) within the range of about 15° and about 25°, after which said planar recessed edge comes to bear against an abutment-forming inside angled edge of said heel, wherein said heel and said planar recessed edge of said side-hinge element extends beyond an axis of said hinge by a predetermined distance (d) wherein said distance of said planar recessed edge beyond said hinge is about twice the distance (d) of said heel beyond said axis of said hinge.

* * * * *